W. H. RUSSELL.
COMBINATION TIRE HOLDER AND EXTRICATOR.
APPLICATION FILED JAN. 31, 1921.

1,402,447.

Patented Jan. 3, 1922.

Inventor:
William Huntington Russell.

UNITED STATES PATENT OFFICE.

WILLIAM HUNTINGTON RUSSELL, OF NEW HAVEN, CONNECTICUT.

COMBINATION TIRE HOLDER AND EXTRICATOR.

1,402,447. Specification of Letters Patent. Patented Jan. 3, 1922.

Application filed January 31, 1921. Serial No. 441,270.

*To all whom it may concern.*

Be it known that I, WILLIAM HUNTINGTON RUSSELL, a citizen of the United States, residing at 175 Bradley St., New Haven, Conn., in the county of New Haven and State of Connecticut, have invented certain new and useful Improvements in a Combination Tire Holder and Extricator, of which the following is a specification.

The invention relates to a combination spare tire holder and extricator for automobiles, and comprises one or more devices which may either be attached to an automobile for holding a spare tire or to the wheel or wheels of an automobile to prevent one or both of the said wheels, as the case may be, from slipping when revolved. The device may be readily detached from the automobile, the spare tire removed and the said device can then be attached to any wheel of the automobile.

The invention consists in the detailed arrangement and construction of parts which will be hereafter fully described and claimed.

Figure 1:
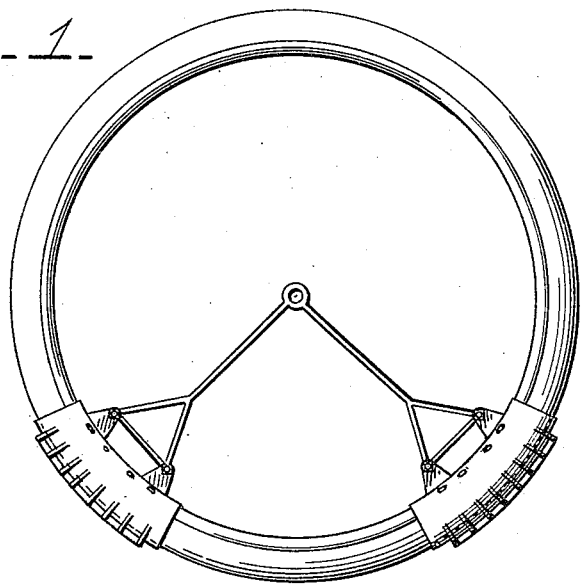
Figure 1 is a side view of the device holding a spare tire and attached to supports.

In the preferred form of the invention two of the devices are used shown in Figure 1 holding a spare tire and attached from automobile supports.

Figure 2:
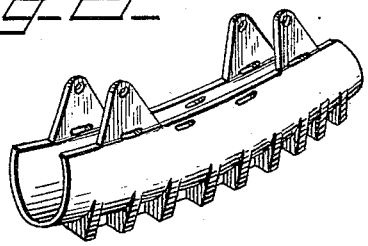
Figure 2 is a side view of the device.
Figure 4:
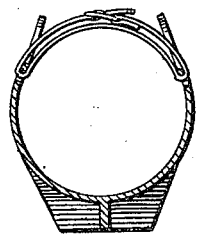
Figure 4 is an end view of the device.
Figure 3:
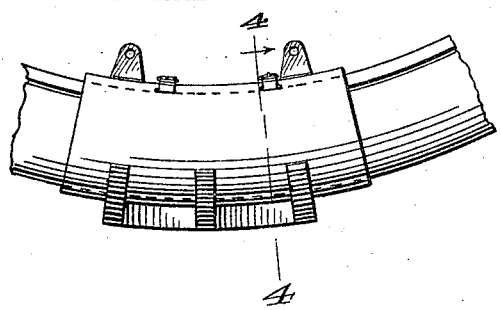
Figure 3 is a side view of the device attached to the wheel of an automobile.

The device as shown in Figure 2 consists of a more or less U shaped body having a number of ribs or ground grippers extending on the outer side of the U shaped surface, with one rib extending along the entire length of the bottom surface to avoid a sidewise slipping of the wheel when attached to the device.

A spare tire is carried by slipping the tire in the U shaped devices and then bolting the devices to the rods or supports which extend from the automobile. The spare tire may be strapped to the device to hold it firmly in position.

When used as an extricator the devices are unbolted from their supports, the spare tire unstrapped and removed and then the devices are strapped in a similar manner one to each rear wheel so that the inner lower part of the U shaped device is on the bottom of the wheel to which it is strapped.

I do not limit myself to the manner of fastening the devices to the automobile or wheels as these may be varied without departing from the spirit of the invention. Neither do I limit myself to the shape of the device or shape of the ground grippers.

What I claim.

1. Spare tire holders having external ground gripping extensions which may be attached to or removed from an automobile, substantially as set forth.

2. A combination spare tire holder and automobile extricator, consisting of substantially U shaped tire holding devices having external ground grippers and means for attaching either the said devices to an automobile and spare tire or to any wheel of the automobile, substantially as set forth.

3. A detachable spare tire holder with means of attaching the same to an automobile, said tire holder having a rough external surface and means for attaching the same to one of the automobile wheels, substantially as set forth.

In testimony whereof I affix my signature.

WILLIAM HUNTINGTON RUSSELL.